March 30, 1954  J. E. LILIENFELD  2,673,955
ALTERNATING CURRENT ELECTROLYTIC CONDENSER
Filed Oct. 27, 1947

Inventor
JULIUS EDGAR LILIENFELD

By Emery Holcombe & Blair
His Attorneys

Patented Mar. 30, 1954

2,673,955

UNITED STATES PATENT OFFICE 2,673,955

ALTERNATING CURRENT ELECTROLYTIC CONDENSER

Julius Edgar Lilienfeld, St. Thomas, V. I., assignor to Samuel D. Warren, Essex, and Ralph F. Burkard, Arlington, Mass., jointly Application October 27, 1947, Serial No. 782,330

11 Claims. (Cl. 323—128)

This invention concerns improvements in the construction and efficiency of operation of electrolytic condensers when used on alternating current (A. C.) circuits for power-factor correction.

It is well known that electrolytic condensers can be satisfactorily operated on direct current (D. C.) circuits for extended periods of time, but when used on alternating current (A. C.) circuits both the capacity and power-factor of the condensers continually increase. Not only does this deterioration set up variations in the constants of the circuit but it results in a shortened and less satisfactory useful life of the condenser with consequently increased costs for replacement, all of which results in a lack of use of electrolytic condensers in the field of power-factor correction.

I have discovered that if the passivating or dielectric layer (aluminum oxide) of an electrolytic condenser is preformed (as shown for example in my U. S. Letters Patent No. 1,950,119) and used in a pure alkaline electrolyte, such as boric acid plus borax, such a dielectric layer will inherently have a greater power loss and deteriorate faster than if the dielectric layer is operated in a less alkaline electrolyte, such as one containing less borax.

On the other hand the resistance of the electrolyte increases the less borax it contains and this increased resistance results in greater I²R power losses within the electrolyte. Therefore the advantage of a lower rate of deterioration gained by using less borax may become offset by the disadvantage of increased power losses if the percentage of borax decreases below the effective level. Hence it is necessary to solve this problem by other and novel means, which is the primary object of this invention.

In operating an electrolytic condenser connected to an A. C. circuit, there is a tendency for an increase of the OH-ion concentration next to the active dielectric layer which increases the rate of deterioration of the active dielectric layer. In prior practice, the active dielectric layer deteriorates steadily, when used on A. C. voltages, and a commercially satisfactory device is impossible of attainment. My present invention provides a method and means to check said deterioration by decreasing the OH-ion concentration in the electrolyte adjacent to the dielectric layer.

This invention consists in the provision of a third element, in addition to the usual anodes and electrolyte of an electrolytic condenser, to wit: electrodes of a new kind and a circuit to make the said electrodes operative, whereby to provide a method for counteracting the above mentioned detrimental effects.

This invention will be more clearly understood when described in connection with the accompanying drawings, in which.

Figure 1:
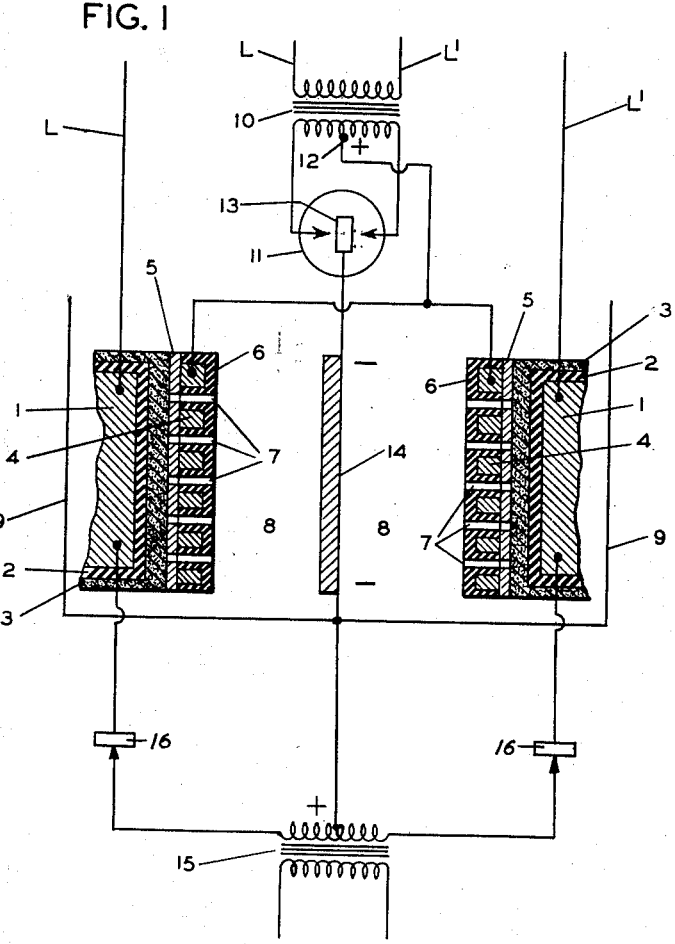
Fig. 1 is a diagrammatic view illustrating the various electrical circuits and connections involved in the invention herein claimed.
Figure 2:
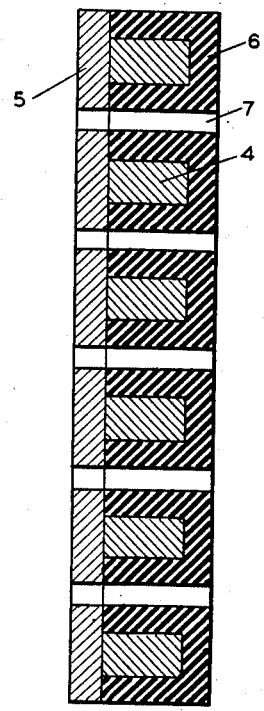
Fig. 2 is a vertical section through the added novel electrode, drawn to a larger scale.

With reference to Fig. 1, each of the two anodes 1 is constructed of a film forming metal such as aluminum. The dielectric film 2, shown in greatly exaggerated thickness, is formed electrolytically by any of the well known methods, or preferably as described in my U. S. Letters Patent No. 2,052,575. Each anode 1 is provided with a thin spacer element 3 which may be paper, tissue, or a layer of porous aluminum phosphate produced electrolytically, for example, as described in my U. S. Patent 2,052,575 (alone or in combination with the other aforesaid spacer elements).

In contact with the porous stratum 3 is a novel added electrode 4, with perforations 7, preferably made of aluminum, although other metals may be used. This electrode 4 is preferably made so that all of its surfaces are insulated, for instance by a film of aluminum oxide formed electrolytically as shown at 6, except for the surface in contact with the porous stratum 3 which should not be insulated from the electrolyte. The surface of electrode 4 contacting porous stratum 3 can be deinsulated by mechanically destroying the aluminum oxide dielectric film on the side which is in contact with the porous stratum 3. If so deinsulated it is preferable to cover this surface of the electrode with a spattered layer of a non-polarizable or non-passivating metal, such as gold, represented at 5 in Fig. 1. This spattered layer can be of minute thickness and will present a non-film forming surface in contact with porous layer 3. Thus the electrode 4 is brought into extreme closeness with the formed anode 1 such that a steady or pulsating E. M. F. applied to electrode 4 will produce, with little expenditure of energy, changes of ion concentration between the anode 1 and the electrode 4 which may be made to counteract the aforementioned undesirable OH- concentration increase at the active dielectric film 2. This advantageous change in ion concentrations at the anode 1 is secured by impressing a unidirectional E. M. F. on electrode 4, such that the OH- ions are attracted away from the active dielectric layer 2 in the electrolyte 8 which is held in a suitable container 9.

Figure 3:
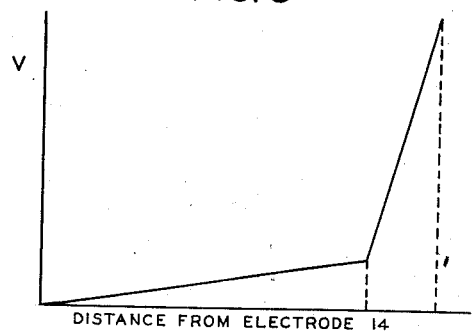
Fig. 3 is a diagram, not to scale, of the geometrical distribution of potential between the three elements of the condenser.

The unidirectional polarizing E. M. F. impressed on the third electrode 4 may be derived from any suitable D. C. source, such as a battery, D. C. generator, rectified A. C., or as shown in Fig. 1. The latter is produced for instance by connecting the transformer primary 10 to an alternating current source; the secondary current being changed to unidirectional by means of rectifier 11 with the circuit completed through the center tap 12 and the end leads of the secondary of transformer 10 which connect with the plate 13 of the rectifier. The unidirectional E. M. F. across points 12 and 13 is connected with positive polarity to the novel electrodes 4 and the negative side to the auxiliary electrode 14. If required, a transformer 15 together with a plurality of rectifiers 16, may be used to provide a source of unidirectional E. M. F. and current to be impressed between anodes 1 and auxiliary electrode 14 to maintain the anodes always positive with respect to the electrolyte 8, which thereby provides a means for maintaining the insulating quality of dielectric film 2. The voltage at different points in the condenser is indicated by the sloping lines in the graph of Fig. 3.

It is to be understood that the substance of this invention is not concerned with the circuit biasing the anodes 1 provided to maintain the anodes positive with respect to the electrolyte inasmuch as said circuit is disclosed in Moscicki U. S. Letters Patent No. 926,128, this being supplemental to the changes in ion concentration due to the provision of the positively charged electrodes 4.

It is also to be specifically understood that said positive biasing of the anodes 1 is not an unconditional requirement for operating the condenser inasmuch as an electrolyte 8 may be used such as to make said biasing unnecessary; an example of such an electrolyte is described in my U. S. Letters Patent No. 2,021,455.

Leads L and L' from the respective anodes 1 are connected to corresponding sides of the alternating current circuit or power line whose power-factor is to be corrected by the condenser.

Many variations for carrying out this invention will occur to those skilled in the art.

I claim:

1. An electrolytic condenser comprising an anode made of a film-forming metal having its surface formed with an insulating coating and a porous stratum outside of the insulating coating, a perforated electrode separated from the anode by the said porous stratum, and an electrolyte in which said anode and said electrode are submerged, in combination with means for maintaining a positive electric potential on said anode and said electrode, and means for connecting said condenser anode in an alternating current power circuit.

2. An electrolytic condenser comprising an anode made of a film-forming metal having its surface formed with an insulating coating and a porous stratum outside of the insulating coating, a perforated electrode made of a film-forming metal having one face coated with a non-filming conducting layer in electrical contact with said electrode metal and separated from said anode by the porous stratum, said electrode being coated with an insulating layer on all except its conducting face, and an electrolyte in which said anode and said electrode are submerged, in combination with means for maintaining a positive electric potential on said anode and said electrode, and means for connecting said condenser anode in an alternating current power circuit.

3. In an electrolytic condenser suitable for operation on alternating voltage and having a pair of formed anodes in an electrolyte adapted for connection to a source of alternating current, porous electrodes juxtaposed to the respective anodes and means for impressing unidirectional current on the respective electrodes for controlling the ion concentration in proximity to the formed anodes.

4. An electrolytic alternating current condenser comprising formed anodes, means for connecting said anodes to a source of alternating current, separate electrodes closely adjacent to the respective anodes, and means for impressing unidirectional current on the separate electrodes.

5. The condenser as claimed in claim 4 wherein the separate electrodes are interposed between the formed anodes and are perforated.

6. The condenser as claimed in claim 5 wherein the separate electrodes are interposed between the formed anodes, are formed of passivating metal and are coated on the surfaces adjacent to the formed anodes with a layer of non-passivating metal.

7. The condenser as set forth in claim 6 wherein the separate electrodes are spaced from their respective anodes by extremely thin porous layers.

8. Method of operating an electrolytic condenser on alternating voltage, which includes changing the ion concentration in the portion of the electrolyte adjacent to the passivating layer of an anode of the condenser by impressing simultaneously with the application of the alternating voltage thereto a potential to the electrolyte adjacent the passivating layer of said anode of the condenser and differing slightly from the potential prevailing at said layer, and maintaining such potential during the operation of the condenser.

9. An anode structure for electrolytic condensers suitable for operation on an alternating current supply circuit, comprising a filmed metal anode, a thin porous separator thereover and a perforated electrode having a non-filming filming surface in contact with the separator, said perforated electrode being wholly insulated except for the surface thereof in contact with the porous separator.

10. An anode structure for electrolytic condensers according to claim 9, wherein the perforated electrode is formed with a thin layer of non-passivating metal along its surface of contact with the separator.

11. In an electrolytic condenser suitable for operation on alternating voltage, a pair of preformed anodes, adapted for connection with a source of alternating current, electrodes in close proximity with the respective anodes, an auxiliary circuit to which said electrodes are connected as anodes, and means in said circuit for supplying a unidirectional current to said electrodes to control the ion concentration in proximity to the preformed anodes.

JULIUS EDGAR LILIENFELD.

(References on following page)

References Cited in the file of this patent

UNITED STATES PATENTS

| Number | Name | Date |
|---|---|---|
| 926,128 | Moscicki | June 29, 1909 |
| 1,473,883 | Slepian | Nov. 13, 1923 |
| 1,497,430 | Chubb | June 10, 1924 |
| 1,753,912 | Woodhull | Apr. 8, 1930 |
| 1,784,674 | Mershon | Dec. 9, 1930 |
| 1,948,864 | Mershon | Feb. 27, 1934 |
| 1,962,943 | Seeley | June 12, 1934 |
| 1,992,809 | Blume | Feb. 26, 1935 |
| 2,220,887 | Classen | Nov. 12, 1940 |
| 2,317,970 | Alimansky | May 4, 1943 |
| 2,349,611 | Butler | May 23, 1944 |

FOREIGN PATENTS

| Number | Country | Date |
|---|---|---|
| 344,236 | France | June 23, 1904 |